(12) United States Patent
Terashita

(10) Patent No.: US 6,919,924 B1
(45) Date of Patent: Jul. 19, 2005

(54) IMAGE PROCESSING METHOD AND IMAGE PROCESSING APPARATUS

(75) Inventor: Takaaki Terashita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/263,842

(22) Filed: Mar. 8, 1999

(30) Foreign Application Priority Data

Mar. 9, 1998 (JP) .......................................... 10-056630
Oct. 12, 1998 (JP) .......................................... 10-289647

(51) Int. Cl.$^7$ ............................................... H04N 9/73
(52) U.S. Cl. ..................................... 348/223.1; 358/521
(58) Field of Search ............................... 358/461, 521, 358/522, 527, 531, 447, 3.01; 348/222.1, 229.1, 362, 671, 672

(56) References Cited

U.S. PATENT DOCUMENTS

| | | | |
|---|---|---|---|
| 4,203,671 A | | 5/1980 | Takahashi et al. .......... 356/402 |
| 4,636,845 A | * | 1/1987 | Alkofer ...................... 358/522 |
| 4,841,362 A | | 6/1989 | Urabe et al. .................. 358/80 |
| 5,046,118 A | * | 9/1991 | Ajewole et al. ............. 382/169 |
| 5,144,445 A | | 9/1992 | Higashitsutsumi ..... 358/213.11 |
| 5,278,921 A | | 1/1994 | Nakamura et al. ............ 382/18 |
| 5,287,418 A | * | 2/1994 | Kishida ....................... 382/169 |
| 5,323,241 A | | 6/1994 | Yonezawa ................... 358/298 |
| 5,629,752 A | | 5/1997 | Kinjo ........................... 355/35 |
| 5,790,280 A | | 8/1998 | Terashita .................... 358/501 |
| 5,812,286 A | | 9/1998 | Lin ............................. 358/519 |
| 5,828,793 A | * | 10/1998 | Mann ......................... 382/284 |
| 5,875,021 A | * | 2/1999 | Yamaguchi ................... 355/35 |
| 5,875,262 A | * | 2/1999 | Asada ......................... 382/169 |
| 6,078,686 A | * | 6/2000 | Kim ........................... 382/167 |
| 6,154,288 A | * | 11/2000 | Watanabe .................... 358/1.9 |
| 6,373,533 B1 | * | 4/2002 | Kawabata et al. .......... 348/672 |
| 2002/0034336 A1 | * | 3/2002 | Shiota et al. ............... 382/274 |

FOREIGN PATENT DOCUMENTS

| | | |
|---|---|---|
| GB | 2067043 | 7/1981 |
| JP | 52-156624 | 12/1977 |
| JP | 56-87044 | 7/1981 |
| JP | 60-14570 | 1/1985 |
| JP | 60-20993 | 2/1985 |
| JP | 2-65374 | 3/1990 |
| JP | 3-198484 | 8/1991 |
| JP | 4-35467 | 2/1992 |
| JP | 4-346332 | 12/1992 |
| JP | 6-152962 | 5/1994 |
| JP | 6-268866 | 9/1994 |
| JP | 7-75006 | 3/1995 |
| JP | 7-073325 | 3/1995 |
| JP | 8-122944 | 5/1996 |
| JP | 9-51433 | 2/1997 |
| JP | 9-121361 | 5/1997 |
| JP | 9-172552 | 6/1997 |
| JP | 9-200559 | 7/1997 |
| JP | 9-238257 | 9/1997 |

* cited by examiner

Primary Examiner—Tuan Ho
Assistant Examiner—Yogesh Aggarwal
(74) Attorney, Agent, or Firm—Morgan, Lewis & Bockius LLP

(57) ABSTRACT

An image processing method for creating a reproduced image by executing image processing on digital image data obtained by a digital camera. This method determines first a density conversion condition for the digital image, determines next a gradation conversion condition for the image on the basis of the density conversion condition, modifies the digital image on the basis of at least one of the density and the gradation conversion conditions, and thus creates the reproduced image. The method may initially separate the digital image data into density component data and color component data, determine the density and gradation conversion conditions by using the density component data instead of the digital image data, modify the density component data in accordance with the density and gradation conversion conditions and synthesize the modified density component data with the color component data.

36 Claims, 9 Drawing Sheets

IMAGE PROCESSING METHOD AND IMAGE PROCESSING APPARATUS

BACKGROUND OF THE INVENTION

1. Field of the Invention

The present invention relates to an image processing method of and an image processing apparatus for executing image processing on digital image data obtained by a digital electronic still camera (which is hereinafter simply referred to as a digital camera).

2. Description of the Related Art

In a digital camera, an image obtained by photographing is recorded as digital image data (having values corresponding to luminance of a subject, in which normally white is 255, and black is 0) on an internal memory incorporated into the digital camera and on a recording medium such as an IC card. Based on the recorded digital image data, the photographed image can be outputted to a printer and a monitor. When printing the image taken by the digital camera, it is expected that the image has quality as high as a photo printed from a negative film.

Therefore, the digital camera incorporates an auto white balance (AWB) function, an auto exposure (AE) control function, and an image processing function. A method of executing the control so that two chrominance (color difference) signals obtained from a mean value of color signals of the imaged areas becomes "0", is disclosed as the AWB function for a video camera in, e.g., Japanese Patent Application Laid-Open Nos. Sho 60-20993 and Hei 3-198484. Further, a method of controlling the exposure by comparing a mean value of the luminance signals of all the imaged areas with a mean value of luminance signals of the selected areas, is disclosed as the AE function in, e.g., Japanese Patent Application Laid-open No. Hei 7-75006.

On the other hand, there has hitherto been known a method of reading a color original image and converting into digital image data, and modifying the digital image data to have a proper gradation, density and color on the basis of image characteristic values such as a maximum reference density, a minimum reference density and a histogram obtained from the digital image data (refer to e.g., Japanese Patent Application Laid-open No. Sho 56-87044). Further, there is also proposed a method of creating a conversion table (look-up table: LUT) for reproducing the original image with fidelity from density signals of the digital image data gained by pre-scanning the color original image, then converting the digital image data obtained by main scan using the conversion table LUT, and thus modifying the digital image data (refer to, e.g., Japanese Patent Application Laid-open No. Hei 6-152962). Disclosed further is a method of creating a digital print by converting a negative film image into digital image data (refer to, e.g., Japanese Patent Application Laid-open No. Sho 60-14570). This method involves creating rough image data for showing a light intensity by pre-scanning the negative film, obtaining density data by logarithmically converting the rough image data, converting the density data into such image data as to obtain a proper color and density through a first conversion table LUT, further converting the thus converted image data into positive image data through a second conversion table LUT, and thus modifying the image data taking into consideration characteristics of a copying machine and a copy material (photosensitive material) for copying the image data.

All the subject is recorded as an image on the negative film by photographing excluding a case where extreme over- and under-exposures happen. Therefore, the digital print from the negative film image can utilize the negative film image fully, arbitrarily or selectively for image reproduction.

As described above, the digital camera incorporates the AWB function, the AE function and the image processing function, and the digital image data acquired by the camera is already subjected to the image processing as explained above. Hence, the digital image data is inputted directly to the copying machine such as a printer, whereby the image can be reproduced. The AWB and AE functions are, however, different in their performances depending on a type of the digital camera, or might not be added thereto in some cases. The copying machine for outputting the images of a variety of digital cameras is incapable of obtaining the print images each exhibiting a uniform quality at all times.

A possible solution to this is, as disclosed in, e.g., aforementioned Japanese Patent Laid-open No. Hei 6-152962, to modify the digital image data. It does not assured, however, that the digital image data acquired by the digital camera is always photographed under proper conditions, and besides the digital image data has a large quantity of noises with respect to a shadow image area as well as being rough in terms of image information. Hence, a high-quality image can not be reproduced even by applying, as the aforementioned conventional method, the method as it is of modifying the digital image data obtained by reading the original image photographed as original copy or reading the negative film.

Therefore, there is proposed a method of creating a histogram of the digital image data acquired by the digital camera, obtaining the minimum value, the maximum value (i.e., the shadow point and the highlight point in the image) and the median value of the histogram, obtaining a gray balance from the minimum and maximum values, then obtaining a gamma curve from the minimum and median values, and converting the digital image data (refer to, e.g., Japanese Patent Application Laid-open No. Hei 9-121361). Proposed also is a method of obtaining effective pixels from brightness and a tint per pixel of the digital image data obtained by the digital camera, setting the highlight point and the shadow point in the image from a cumulative histogram of mean density value of the effective pixels, and outputting them to a recording medium such as a CRT and a CD-ROM (refer to, e.g., Japanese Patent Application Laid-open No. Hei 9-238257).

Those methods are, however, contrived to modify the gradations and the colors of the whole digital image data from the highlight point and the shadow point in the image, and the digital image data is based on a premise that a principal image area has a proper value with an adequate exposure. In some of the actual digital cameras, it might often happen that the image data is created with an inadequate exposure such as an overexposure, an underexposure and a mis-modulation of light of an electronic flash etc, and it is of much importance to modify the density of the output image.

SUMMARY OF THE INVENTION

The present invention has been made in view of the above, and an object of the present invention is to provide an image processing method and an image processing apparatus that are capable of obtaining a high-quality image by automatically or manually modifying a density of digital image data acquired by a digital camera.

Another object of the present invention is to provide an image processing method and an image processing apparatus that are capable of obtaining a high-quality image by automatically or manually modifying the density from digital image data of which a principal image area does not have a proper value as well as from image data of digital cameras with different exposures when photographing.

To accomplish the above objects, according to the present invention, an image processing method of creating a reproduced image by executing image processing on digital image data obtained by a digital camera, is characterized by comprising a step of determining first a density conversion condition for an image expressed by the digital image data, a step of determining next a gradation conversion condition for the image expressed by the digital image data on the basis of the density conversion condition, a step of modifying the digital image data on the basis of at least one of the density conversion condition and the gradation conversion condition, and a step of thus creating the reproduced image.

According to the present invention, an image processing method of creating a reproduced image by executing image processing on digital image data obtained by a digital camera, is characterized by comprising a step of separating the digital image data into density component data and color component data, a step of determining a density conversion condition for converting a density of the density component data, and determining a gradation conversion condition for converting a gradation of the digital image data on the basis of the density conversion condition, a step of modifying the density component data in accordance with the density conversion condition and the gradation conversion condition, a step of synthesizing the modified density component data with the color component data, and a step of thus creating the image data for obtaining the reproduced image.

It is preferable that the density conversion condition be determined based on a characteristic value of the image expressed by the digital image data.

Further, it is preferable that the characteristic value of the image be a mean value of densities of the digital image data, or a weighted mean value based on a weight coefficient determined by a color in each pixel of the digital image data.

It is also preferable that the gradation conversion condition be so determined as to harden and soften a tone of the image expressed by the digital image data on the basis of a predetermined value.

The density conversion condition may be, when the image expressed by the digital image data is displayed on display means, determined by an instruction from outside on the basis of the displayed image.

Moreover, it is preferable that the gradation conversion condition be determined so that the brightest area of the reproduced image is white or has a density approximate to the white.

It is still further preferable that the gradation conversion condition has a lower limit value thereof.

According to the present invention, an image processing apparatus for creating a reproduced image by executing image processing on digital image data obtained by a digital camera, is characterized by comprising a density conversion condition determining means for determining a density conversion condition for an image expressed by the digital image data, a gradation conversion condition determining means for determining a gradation conversion condition for the image expressed by the digital image data on the basis of the density conversion condition, and an image data converting means for creating the reproduced image by modifying the digital image data on the basis of at least one of the density conversion condition and the gradation conversion condition.

According to the present invention, an image processing apparatus for creating a reproduced image by executing image processing on digital image data obtained by a digital camera, is characterized by comprising a data separating means for separating the digital image data into density component data and color component data, a density conversion condition determining means for determining a density conversion condition for converting a density of the density component data, a gradation conversion condition determining means for determining a gradation conversion condition for converting a gradation of the digital image data on the basis of the density conversion condition, a data converting means for modifying the density component data in accordance with the density conversion condition and the gradation conversion condition, and a data synthesizing means for synthesizing the modified density component data with the color component data.

It is preferable that the density conversion condition determining means determines the density conversion condition on the basis of a characteristic value of the image expressed by the digital image data.

It is also preferable that the characteristic value of the image be a mean value of densities of the digital image data, or a weighted mean value based on a weight coefficient determined by a color in each pixel of the digital image data.

It is further preferable that the gradation conversion condition be so determined as to harden and soften a tone of the image expressed by the digital image data on the basis of a predetermined value.

The density conversion condition determining means may determine, when the image expressed by the digital image data is displayed on display means, the density conversion condition by an instruction from outside on the basis of the displayed image.

It is still further preferable that the gradation conversion condition determining means determines the gradation conversion condition so that a brightest area of the reproduced image is white or has a density approximate to the white.

Moreover, it is preferable that the gradation conversion condition determining means provides the gradation conversion condition with a lower limit value.

According to the present invention, the "characteristic value" is a value characterizing a density and a color of the digital image data, and encompasses a variety of values such as a mean value of the digital image data, a weighted mean value based on a weight coefficient determined by a color in each of pixels of the digital image data, a mean value or a weighted mean value of rough image data obtained by thinning out the pixels of the digital image data, a mean value obtained by making the weight coefficient smaller toward a higher color saturation area in color coordinates created from respective RGB color signals of the digital image data, a mean value obtained by making the weight coefficient smaller as a distance from a color temperature trajectory (see FIG. 2) and from the origin on the color coordinates grows larger, a mean value taking lightness into consideration, a mean value obtained by changing the weight coefficient in correspondence with a subject and a scene, and a mean value of an image area corresponding to the skin, especially, the face of a person defined as a principal subject.

Further, the representative value representing the principal image area implies a value (image data, and a density value, etc.) with which the principal image area is directly or indirectly or statistically estimated based on the characteristic value given above. The reason why the representative value is derived in such a manner is to eliminate an influence upon the converted representative value due to an interaction between the modified image data and the digital image data.

Further, according to the present invention, the "density" of the density conversion condition and of the digital image data is a value or data with which a density of the reproduced image can be controlled. For example, as for image data of R, G and B, the density of the reproduced image can be controlled by controlling three colors in the same way. In such a case, the RGB image data is included. Further, there may also be included a three-color mean value obtained by the weighted mean value of the RGB image data, a luminance, lightness or values corresponding thereto.

More specific structures of the image processing method and of the image processing apparatus of the present invention, are given, for instance, as follows:

(1) The image processing method of obtaining the processed image data by executing the image processing on the digital image data acquired by the digital camera, is characterized by comprising the step of obtaining the characteristic value characterizing the image expressed by the digital image data, the step of obtaining the modification value for modifying the density and color of the output image expressed by the digital image data on the basis of the characteristic value, the step of obtaining the relationship between the digital image data and the modified image data obtained by modifying the digital image data on the basis of the modification value, the step of obtaining, on the occasion of acquiring the modified image data by converting the digital image data on the basis of the above relationship, the conversion table showing a modified relationship between the modified image data and the digital image data by modifying the above relationship so that the data of the highlight area of the modified image data is hardened in its tone when the density of the output image expressed by the modified image data increases, and so that the data of the highlight area of the modified image data is softened in its tone when the density of the output image decreases, and the step of obtaining the processed image data by converting the digital image data in accordance with the conversion table.

(2) The image processing apparatus for obtaining the processed image data by executing the image processing on the digital image data acquired by the digital camera, is characterized by comprising the characteristic value calculating means for obtaining the characteristic value characterizing the image expressed by the digital image data, the modification value calculating means for obtaining the modification value for modifying the density and color of the output image expressed by the digital image data on the basis of the characteristic value, the conversion table creating means for obtaining the relationship between the digital image data and the modified image data obtained by modifying the digital image data on the basis of the modification value, and obtaining, on the occasion of acquiring the modified image data by converting the digital image data on the basis of the above relationship, the conversion table showing a modified relationship between the modified image data and the digital image data by modifying the above relationship so that the data of the highlight area of the modified image data is hardened in its tone when the density of the output image expressed by the modified image data increases, and so that the data of the highlight area of the modified image data is softened in its tone when the density of the output image decreases, and the modifying means for obtaining the processed image data by converting the digital image data in accordance with the conversion table.

According to the image processing method and the image processing apparatus described above, it is preferable that the processed image data be further modified based on a reproducing aim value of a reproducing apparatus for reproducing the processed image data.

Herein, the processed image data is modified based on the reproducing aim value of the reproducing apparatus, which implies that the reference value of the digital image data can be reproduced properly by the reproducing apparatus. For example, it means that if respective RGB signal values take 255, 255, 255 (in the case of 8 bits) as the reference value, the reproducing aim value is white, and the modification is made so that the reference value turns out to be white.

According to the image processing method and the image processing apparatus of the present invention, the modification value for modifying the density and the color of the output image expressed by the digital image data, is automatically obtained from the characteristic value of the digital image data acquired by the digital camera, or alternatively the modification value is given from outside. Based on this modification value, the relationship between the modified image data and the digital image data is obtained. Thereafter, based on this relationship, an overexposure and an underexposure of the digital camera are corrected so that the density and the color of the reproduced image become optimal. Then, the digital image data can be converted so that the principal image area can be reproduced to a uniform image density and with a preferable gradation expression.

In the prior art, when the digital image data is converted so that the density of the output image decreases based on the above relationship, the data of the highlight area of the output image is saturated to the maximum value, and the image is unable to be reproduced because of a washed-out image being discontinued in density. Further, when the digital image data is converted so that the density of the output image increases, the white of the subject is unable to be reproduced as being white, and at the same time the density increases while the highlight area assumes a tone softening characteristic, with the result that the output image becomes unnatural.

Therefore, according to the image processing method and the image processing apparatus of the present invention, if there increases the density of the output image expressed by the modified image data obtained by converting the digital image data based on the above relationship, this relationship is modified so that the data of the highlight area of the modified image data is hardened in terms of its tone. Whereas if there decreases the density of the output image, the above relationship is modified so that the data of the highlight area of the modified image data is softened in tone. Thereby the conversion table showing the modified relationship is obtained.

Accordingly, with respect to the processed image data acquired by converting the digital image data in accordance with the conversion table, it never happens that the image of the highlight area is washed-out and discontinued in density even when the density decreases, as well as, even when the density increases, the white can be reproduced as being white. As a result, the high-quality reproduced image can be obtained by reproducing this piece of processed image data. Note that the increase and decrease in the density herein imply a change in the density of the whole image.

Moreover, as for the over- and under-exposure images, the gradations of the highlight areas thereof are modified to proper values, whereby latitude of the exposure of the digital camera can be increased. This makes it possible to reduce the defective images. Further, the mean value or the weighted mean value as a characteristic value is obtained from the rough image data created by thinning out the pixels of the digital image data or synthesizing the plurality of pixels, whereby a calculation time for obtaining the characteristic value can be reduced. This enables the image processing to be executed at a high speed.

Furthermore, the tone hardening or softening is performed based on a value corresponding to the principal image area in the image expressed by the digital image data, thereby hardening and softening the tone of the highlight area of the processed image data without changing the density of the image in the vicinity of the principal image area. Incidentally, in this case, as a consequence of trying to uniformizing the density of the principal image area, mainly the gradation of the background image exclusive of the principal image area is to be changed in the tone hardening/softening process.

These together with other objects and advantages that will be subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DETAILED DESCRIPTION OF THE INVENTION

Preferred embodiments of the present invention will hereinafter be described in details with reference to the accompanying drawings.

Figure 1:
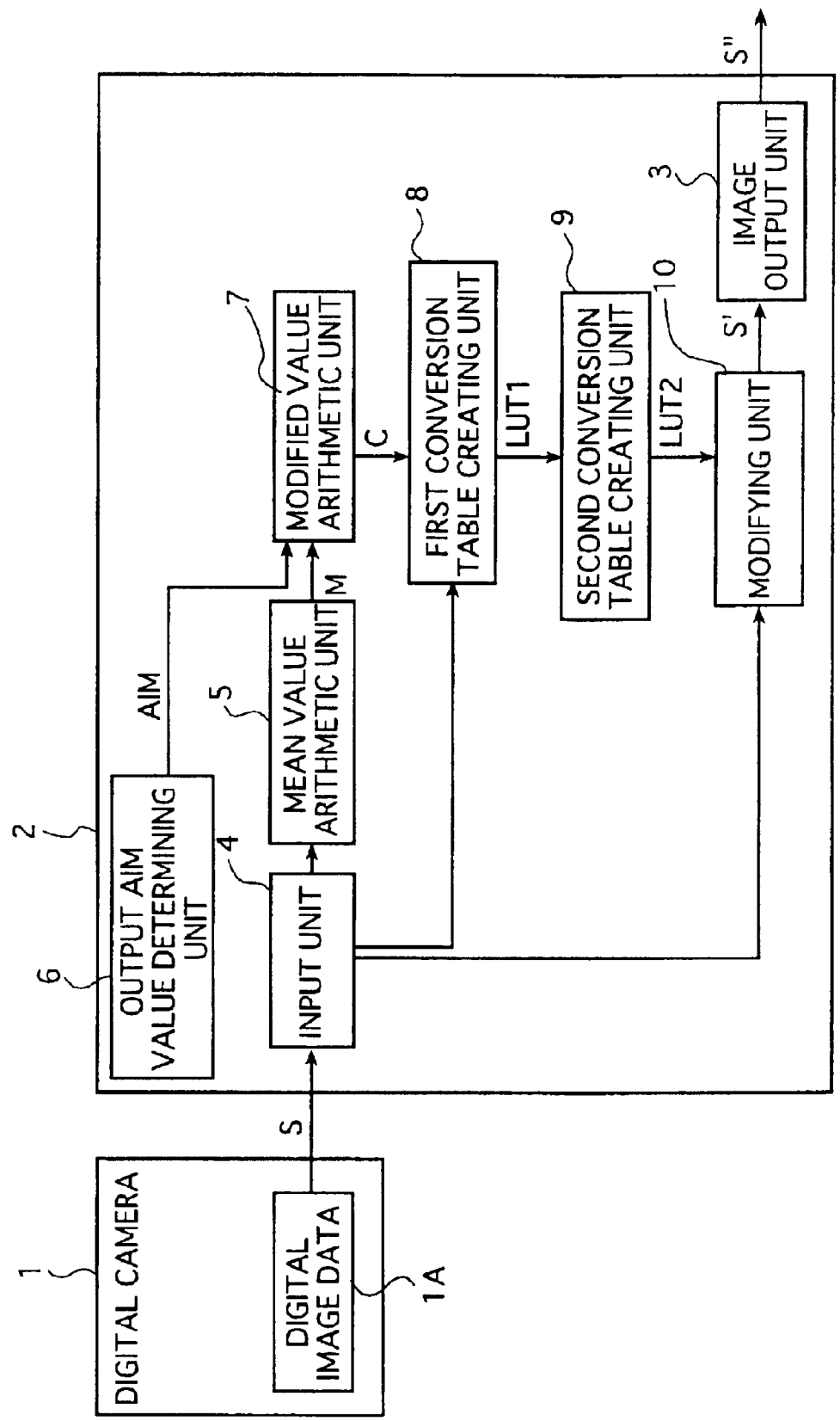
FIG. 1 is a block diagram showing a construction of an image reproducing system encompassing an image processing apparatus in one embodiment of the present invention.

FIG. 1 is a block diagram schematically showing a construction of an image processing apparatus in a first embodiment of the present invention. What is actualized in the first embodiment is a method of obtaining processed image data by converting digital image data on the basis of a conversion table showing a relationship between the digital image data and modified image data.

An image processing apparatus 2 shown in FIG. 1 executes the image processing on digital image data S obtained by a digital camera 1.

The digital camera 1 records, on a recording medium 1A, the digital image data obtained by photographing a subject.

The image processing apparatus 2 is comprised of an input unit (means) 4 for reading the digital image data S from the recording medium 1A, as will be described later, a mean value arithmetic unit (means) 5 for obtaining a mean value M of the digital image data S, and an output aim value determining unit (means) 6 for determining an output aim value AIM of processed pieces of image data S'. The image processing apparatus 2 further comprises a modification value arithmetic unit (means) 7 for obtaining a modification value C for modifying the digital image data S on the basis of the mean value M obtained by the mean value arithmetic unit 5 and the output aim value AIM determined by the output aim value determining unit 6, a first conversion table creating unit (means) 8 for creating a first conversion table (LUT1) for converting the digital image data S on the basis of the modification value C obtained by the modification value arithmetic unit 7, and a second conversion table creating unit (means) 9 for obtaining a second conversion table (LUT2) in which the first conversion table (LUT1) is modified. The image processing apparatus 2 still further comprises a modifying unit (means) 10 for obtaining the processed image data S' by converting the digital image data S with the aid of the second conversion table (LUT2) described above, and an image output unit (means) 3 for outputting the processed image data S' to a printer etc.

Figure 2:
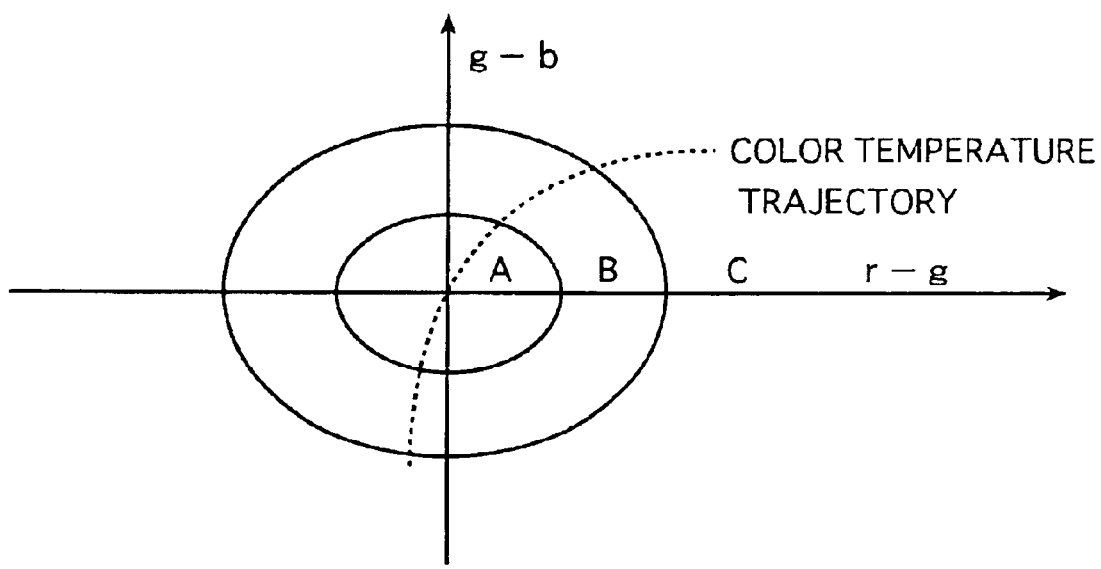
FIG. 2 is a graph showing color coordinates.

The above mean value arithmetic unit 5 analyzes RGB image signals corresponding to respective pixels of the digital image data S by a predetermined method, and thus obtains the mean value M of RGB image signals selected based on a result of this analysis. This mean value M, as will be explained later on, contains a representative value representing a principal image area. To be more specific, as illustrated in FIG. 2, color coordinates are set, wherein r-g is the axis of abscissas, and g-b is the axis of ordinates. In the color coordinates, a pixel existing in closer proximity to the origin is weighted larger. Namely, in the color coordinates shown in FIG. 2, color saturation becomes lower as it gets closer to the origin. Hence, there are set a region A in the vicinity of the origin, a region B extending outside the region A, and an outermost region C, weight coefficients 1.0, 0.5 and 0, by which the pixels disposed in the respective regions are multiplied, are set in sequence from the region A, and a weighted mean value M of the RGB image signals multiplied by these weight coefficients is obtained. The signal exhibiting lower color saturation is thereby weighted larger, and therefore the thus obtained weighted mean value M represents remarkably a characteristic of the image.

Note that the calculation of the weighted mean value M in the first embodiment is not limited to what has been described so far, and may be done such as setting the weight coefficients in color coordinates with axes b-r and r-g or in color coordinates with axes b-r and g-b, or setting the color coordinates based on saturation signals and hue signals into which the RGB image signals are classified. Further, the weight coefficient described above may be weight a coefficient proportional to a distance from the origin of the color coordinates or from a desired color temperature trajectory (see FIG. 2) set on the color coordinates. Moreover, taking lightness of the RGB image signal into consideration, the weight coefficient maybe set smaller as the lightness becomes higher.

In addition, the weight coefficient may be changed in correspondence with the subject or a scene. Take a sunset scene for example, photographers do not, it seems, want to modify the sunset portion in the picture in the great majority of cases, and hence the weight coefficient is set small with respect to the sunset portion. Further, there may be obtained a mean value of only an image area corresponding to the skin, especially, the face of a person defined as the principal subject, and may also be obtained separately a mean value for controlling the color and a mean value for controlling a density. It is to be noted that a method of extracting the face area may involve the use of a variety of known methods such as a skin-color detecting method disclosed in, e.g., Japanese Patent Application Laid-open No. sho 52-156624, a method of detecting the face area from a similar color cluster image as disclosed in Japanese Patent Application Laid-open No. Hei 4-346332, and a method of detecting the face area from a configuration as disclosed in Japanese Patent Application Laid-open No. Hei 8-122944. Further, the mean value M may also be obtained without the multiplication of the weight coefficient.

Moreover, the image area left by eliminating a background image area may be set as a principal image area, and a mean value of the image data of the principal image area may be obtained. On this occasion, the background image area may be a neutral color image area over a certain a real size in a highlight image area and a shadow image area, and it is possible to enhance a judging accuracy by adding such a condition that a difference between pixel values be small, and so forth.

Figure 3:
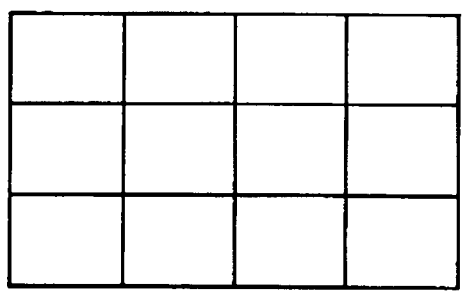
FIG. 3 is a view showing a state where an image expressed by digital image data is divided into a plurality of areas.

There may also be used a weighted mean value of a plurality of image characteristic values characterizing the image, which is included in the calculation for obtaining the mean value according to the present invention. For instance, as shown in FIG. 3, the image expressed by the digital image data is divided into a plurality of areas, and a mean value (mean j, where j is the position of the area) of each divided area is obtained. Herein, let kj be the weight coefficient, the mean value M is given such as M=Σ (kj·mean j). The weight coefficient kj can be determined statistically by a multiple regression analysis, wherein an image data modification quantity for obtaining a desired output value is set as an objective function (variable), and the image characteristic value is set as an explanatory function (variable). The obtained mean value is a value for estimating a density of the principal image area. For example, when a value 255 (in the case of 8 bits) of the digital image data is outputted as being white, a difference between the estimated value and 128 (when the density of the principal image area is 0.7) may be outputted as the modification value C.

Note that the characteristic value is not limited to the mean value M given above, and may be a value obtained from a histogram and a cumulative histogram etc.

Further, rough image data is obtained by thinning out the pixels of the digital image data S at a certain interval, and a mean value M of this piece of rough image data may be obtained. The mean value M of the rough image data is thus obtained, whereby normally several millions of pixels are reduced down to several hundred thousands pixels through several ten thousands of pixels and a calculation time can be remarkably decreased. Incidentally, in this case, a mean value of a plurality (e.g., 5×5) of pixels is obtained and may be set as rough image data. Moreover, there are used this piece of rough image data and rough image data obtained by thinning out the pixels, thereby enhancing a precision of the mean value.

Further, the mean value M may also be obtained as a logarithmic value. In this case, a logarithmic conversion may be performed after obtaining the mean value of the digital image data S, or the mean value M may be obtained after logarithmically converting the digital image data S. Moreover, when the mean value M of the rough image data is obtained, the logarithmic conversion may also be implemented after creating the rough image data, or alternatively the rough image data may be created after logarithmically converting the digital image data S. In this instance, the calculation is performed, wherein the both of the digital image data S and the output aim value AIM are treated as logarithmic values. Thus, the mean value M is obtained as the logarithmic value, whereby the data comes to have a linear characteristic having no dependency on the density. As will be mentioned later on, the calculation when in the modification is facilitated.

The output aim value AIM determined by the output aim value determining unit 6 may also be a predetermined certain value. In this instance, for example, 0.70 may be set when the mean value M is a logarithmic value, and 128 may be set in the case of an anti-logarithmic value. Further, when the weighted mean value M is obtained by the mean value arithmetic unit 5, the output aim value AIM may be set as a mean value of the RGB image signals. Moreover, the output aim value AIM may also be changed in correspondence with the subject and the scene. For example, if the number of pixels selected for calculating the mean value is extremely small, the output aim value AIM is set referring to the RGB image signals of the non-selected pixels, in which case this can be applied to a scene of which a color is far from other scenes such as a sunset, flowers and greens in terms of comparison therebetween. Further, the output aim value AIM may be varied depending on whether the mean value M obtained by the mean value arithmetic unit 5 is a value corresponding to a face of the person or indicates gray.

The modification value arithmetic unit 7 obtains such a modification value C that the mean value M obtained by the mean value arithmetic unit 5 is coincident with the output aim value AIM determined by the output aim value determining unit 6. Namely, if both of the mean value M and the output aim value AIM are logarithmic values, the modification value C is given by:

$$\text{Modification Value C} = \text{Mean Value M} - \text{Output Aim Value AIM}$$

If both of the mean value M and the output aim value AIM are anti-logarithmic values, the modification value C is given by:

$$\text{Modification Value C} = \text{Mean Value M}/\text{Output Aim Value AIM}$$

Further, the modification value C may be given by:

$$\text{Modification Value C} = \text{Mean Value M} - (\text{Output Aim Value AIM} - K),$$

and $$\text{Modification Value C} = K \times \text{Mean Value M}/\text{Output Aim Value AIM}$$

where K is the constant or variable taking preference into consideration.

The first conversion table creating unit 8, to start with, obtains modified image data by modifying the digital image data S with the modification value C. Herein, the digital image data S is composed of the RGB image signals, and the modification value is determined corresponding to each of R, G and B. The modified image data is therefore composed of the RGB image signals. Herein, however, for simplicity, the explanation is given using representatively the digital image data S, the modification value C and the modified image data. Note that a density of a reproduced image can be modified when the modification value R=G=B, and the color is modified when a modification value of at least one color is substantially "0".

Figure 4:
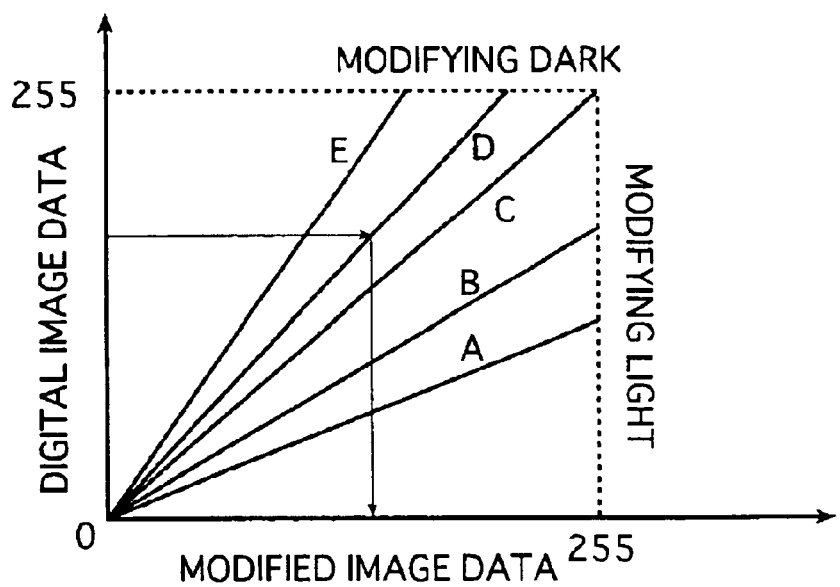
FIG. 4 is a diagram showing one example of a first conversion table.

The first conversion table creating unit 8, after obtaining the modified image data, creates the first conversion table (LUT1) for showing a corresponding relationship between the digital image data S and the modified image data. FIG. 4 shows one example of the first conversion table (LUT1). Note that the first conversion table (LUT1) serves to convert the digital image data S of anti-logarithmic value into modified image data of anti-logarithmic value. FIG. 4 shows a reference condition C under which the digital image data S is treated without being modified as modified data, two-stage conditions D, E under which a density of the digital image data S is increased, and two-stage conditions A, B under which to decrease the density of the digital image data S. As a matter of fact, however, one conversion condition showing a relationship between the digital image data S and the modified image data is determined based on the modification value C.

Herein, the conversion conditions D, E are conditions for modifying the digital image data S obtained by photographing with, e.g., an overexposure. The conversion conditions A, B are conditions for modifying the digital image data S obtained by photographing, e.g., a contrejour scene. Note that the digital image data S consists of 8 bits, and the maximum value of the pixel value is set to 255 in the first embodiment.

The second conversion table creating unit 9 creates a second conversion table (LUT2) for converting the digital image data S into a processed piece of modified image data S' by modifying the first conversion table (LUT1) created by the first conversion table creating unit 8. For example, as in the case of the conversion conditions A, B in FIG. 4, under the condition for decreasing the density of the digital image data S, the modified image data is converted into data having a large value (which implies a low density), and with respect to even the digital image data S of which the pixel value is not more than 255, since the modified image data is saturated with the pixel value of 255, it is therefore impossible to reproduce the image because of the image becoming white.

Figure 5:
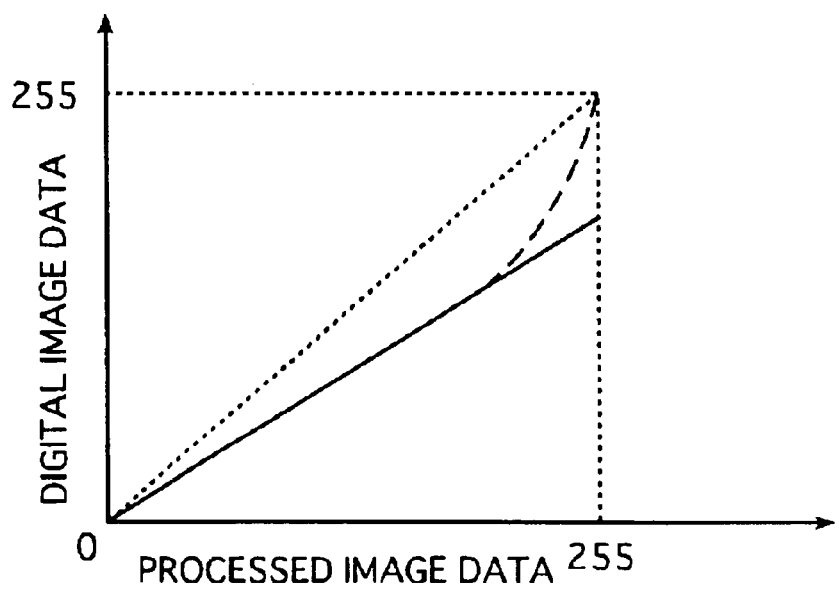
FIG. 5 is a diagram showing one example of a second conversion table.

Accordingly, as shown in FIG. 5, all or a part of the highlight image area of the modified image data is linearly or non-linearly softened in terms of its tone, whereby the digital image data 255 can be made coincident with the processed image data 255. Namely, the conversion condition is modified so as to compresses the digital image data S. Thus, the highlight image area is softened in its tone, and it follows that the image area that is to be saturated in the modified image data can be reproduced in the processed modified image data S'. Note that the tone softening is required to be done more as the digital image data S is more modified to attain a larger value as being the processed modified image data S'. A limit value may, however, be set in the tone softening, or a degree of the tone softening may be made smaller with the conversion into a larger value as being the processed modified image data S'.

Figure 6:
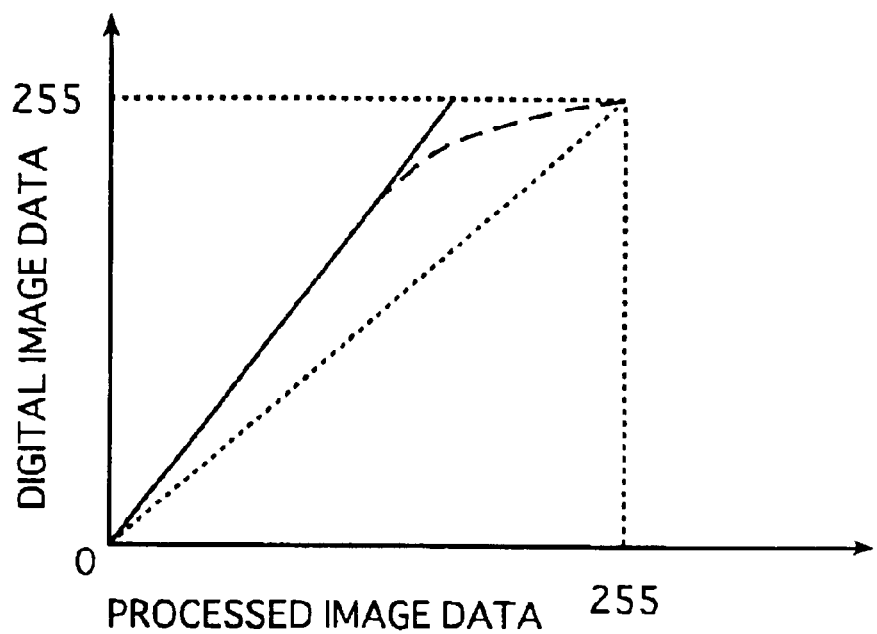
FIG. 6 is a diagram showing another example of the second conversion table.

On the other hand, as in the case of the conversion conditions D, E in FIG. 4, under the condition for increasing the density of the digital image data S, the modified image data is converted into a small value (which implies a high density), and therefore the image in the vicinity of the pixel value 255 in the digital image data S takes a smaller value than the above value, with the result that the white is unable to be reproduced as being white. Further, in the case of a digital camera incorporating a function of processing the digital image data S by slightly softening the tone of the highlight image area, if the density is increased, it follows that the image from the highlight image area toward an area exhibiting a higher density is reproduced in an as-softened state. As a result, the image expressed by the modified image data turns out to be unnatural. For preventing this phenomenon, as shown by the broken line in FIG. 6, the conversion condition is modified so that all or a part of the highlight image area of the modified image data is linearly or non-linearly hardened in tone, i.e., so that the digital image data S is extended.

As discussed above, the tone of the highlight image area is hardened, whereby the white can be reproduced as being white in the image obtained by reproducing the processed image data S'. Further, even an over-exposure image, of which a density has hitherto been difficult to be modified, can be reproduced as a proper image by hardening the tone of the highlight area. Note that more tone hardening is required to be done as the digital image data S is modified to attain a smaller value as being the processed modified image data S'. A limit value may, however, be set in the tone hardening, or a degree of the tone hardening may be made smaller with the conversion into a smaller value as being the processed modified image data S'.

In the discussion given above, the first conversion table creating unit 8 and the second conversion table creating unit 9 are constructed as separate units. There is, however, no necessity for separating these units, and the tables may be created by the same conversion table creating unit. What is used for the present image processing is the second conversion table, while the first conversion table has no utility other than being used for obtaining the second conversion table. According to the present invention, the gradation conversion condition is determined after the density conversion condition has been determined, and hence, the explanations of the conversion tables are given separately for an explanatory convenience.

Figure 7:
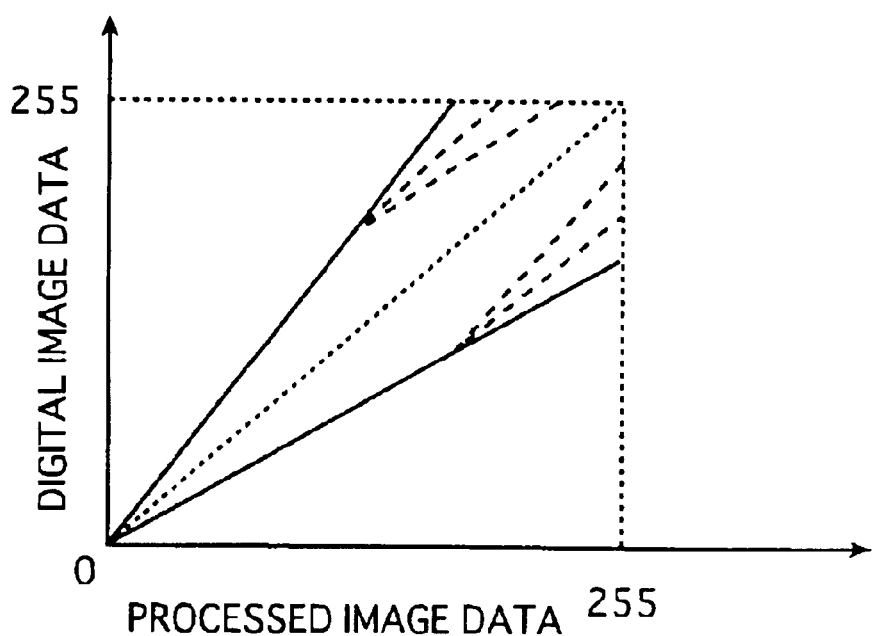
FIG. 7 is a diagram showing still another example of the second conversion table.

A degree of modification of the first conversion table (LUT1) may be obtained in accordance with one predetermined or a plurality of predetermined basic gradation conversion curves. Further, the degree of modification may be obtained by a calculation using functions approximate to the gradation conversion curves. In addition, for simplifying the calculation, as shown in FIG. 7, the modification may be linearly made. Furthermore, the degree of modification may be changed corresponding to a scene and a quantity of characteristics. A table for converting the density of the digital image data S and a table for converting the gradation of the same, may also be separately given as the second conversion tables (LUT2). It is also possible that the digital image data S is separated into a piece of density component data and a piece of color component data, then the density component data is modified by the second conversion table (LUT2), and thereafter the modified density component data is synthesized with the color component data.

Moreover, a point (hereinafter referred to as a brake point) at which the conversion condition in the first conversion table (LUT1) is modified may be a predetermined value, or may be determined in advance corresponding to a gradient of the conversion condition, or properly varied corresponding to a type of the camera, a subject scene and a state of the image. Further, in the second conversion table (LUT2), a point of the pixel value 255 of the digital image data S is not necessarily made coincident with a point of the pixel value 255 of the processed image data S'. For instance, the above points may be points of 0.3% and 1.0% from the maximum value in the histogram of the digital image data S, and points of 99.0% and 99.7% in the cumulative histogram.

The modifying unit 10 obtains the processed image data S' by converting the digital image data S using the second conversion table (LUT2) created by the second conversion table creating unit 9. Thus, the digital image data S is converted by the second conversion table (LUT2) to reproduce the processed image data S', thereby obtaining the image. The density of the thus obtained image can be made proper, and it is possible to obtain the reproduced image exhibiting neither unnaturalness nor image extinction in the highlight area.

The image output unit 3 modifies the processed image data S' so that the processed image data S' can be reproduced with a predetermined output density on the basis of a reproduction aim value of a reproducing apparatus such as a CRT and a printer. More specifically, the digital image data S obtained in the digital camera 1 is modified into the processed image data S' so that the gray in the subject becomes a predetermined piece of gray data irrespective of the type of the camera, the AWB or the AE control and the subject scene. Then, the image output unit 3 modifies the data S' into output image data S" so that the gray data is reproduced as a gray image, taking characteristics of the reproducing apparatus into consideration. Therefore, the data is converted into the final output image data S" using, e.g., the LUT so that a reference value of the processed image data S' becomes a predetermined output density (a reproduction aim value).

Herein, there are two usable methods of performing the conversion so that the reference value of the processed image data S' becomes the predetermined output density. According to the first method, the maximum value (each image signal value of R, G and B is 255 in the case of, e.g., 8 bits) which can be taken by the image expressed by the processed image data S', is set as a reference value, and the processed image data S' is converted so that this reference value turns out to be white. As described above, the processed image data S' is converted so that the maximum values (255, 255, 255) of the respective image signal values of R, G and B turn out to be white, whereby the subject assuming the gray can be reproduced in gray.

According to the second method, a mean value of the processed image data S' is used as the reference value, and the conversion is performed so that the above mean value becomes, e.g., an output density 0.70 (which is given in the case of the logarithmic value, and is 128 in the case of the anti-logarithmic value). Based on the second method, the subject assuming the gray can be also reproduced in gray by reproducing the output image data S".

Note that a matrix calculation for a color modification may be effected on the processed image data S' in the image output unit 3 in order to obtain the reproduced image exhibiting a much higher image quality.

Subsequently, an operation in the first embodiment will be explained.

To begin with, the subject is photographed by the digital camera 1, thereby obtaining the digital image data S. This piece of digital image data S is recorded on a recording medium 1A. The input unit 4 of the image processing apparatus 2 reads the digital image data S from the recording medium 1A, and inputs the digital image data S to the mean value calculating unit 5, the first conversion table creating unit 8 and the modifying unit 10. The mean value calculating unit 5, as explained above, obtains a mean value or a weighted mean value M (hereinafter simply referred to as a mean value M) of the digital image data S. On the other hand, the output aim value determining unit 6 determines the output aim value AIM. The mean value M and the output aim value AIM are inputted to the modification value calculating unit 7, wherein the modification value C is obtained as described above.

The modification value C is inputted to the first conversion table creating unit 8, and the first conversion table (LUT1) is, as stated above, created based on this modification value C. Further, the first conversion table (LUT1) is modified in the second conversion table creating unit 9 as explained above, thereby creating the second conversion table (LUT2).

The second conversion table (LUT2) is inputted to the modifying unit 10, thereby obtaining the processed image data S' into which the digital image data S is converted by the second conversion table (LUT2). The processed image data S' is modified by the image output unit 3 so that the reference value is equal to a predetermined density, thus obtaining the final output image data S". The output image data S" is inputted to the reproducing apparatus such as the printer and the CRT, and is reproduced therein as a visible image.

As discussed above, in the first embodiment, if there increases the density of the output image expressed by the modified image data obtained by converting the digital image data S using the first conversion table (LUT1), the second conversion table (LUT2) is obtained by modifying the first conversion table (LUT1) so that the data of the highlight area of the modified image data is hardened in tone. Whereas if there decreases the density of the output image, the second conversion table (LUT2) is obtained by modifying the first conversion table so that the data of the highlight area of the modified image data is softened in tone. Therefore, if the processed image data S' obtained by converting the digital image data S using the second conversion table (LUT2) becomes thin in color, the highlight area is not saturated. Further, if thick in color, the white in the highlight area can be reproduced as being white. Then, the high-quality reproduced image can be obtained by reproducing this piece of processed image data S'.

Note that the output aim value determining unit 6 determines the output aim value AIM in the first embodiment, however, the output aim value AIM is normally a certain value, and hence there may be predetermined arithmetic conditions for obtaining the output aim value such as the calculation formula and the calculation method. The calculation formula and the calculation method are thus predetermined, thereby eliminating the necessity for the output aim value determining unit 6. The present invention is not therefore limited to the apparatus including the output aim value determining unit 6.

Further, in the first embodiment, the digital image data S is converted by the second conversion table (LUT2), and consequently the calculation time can be reduced as compared with a system in which modification is effected for every pixel. Namely, if the calculation of each pixel is executed, the calculations for the number of pixels (several hundred thousands to several millions) are needed. The (256×3) calculations may, however, suffice for obtaining the table when the digital image data S is the 8-bit data. The high-speed calculation can be implemented by remarkably reducing the quantity of calculations.

Figure 8:
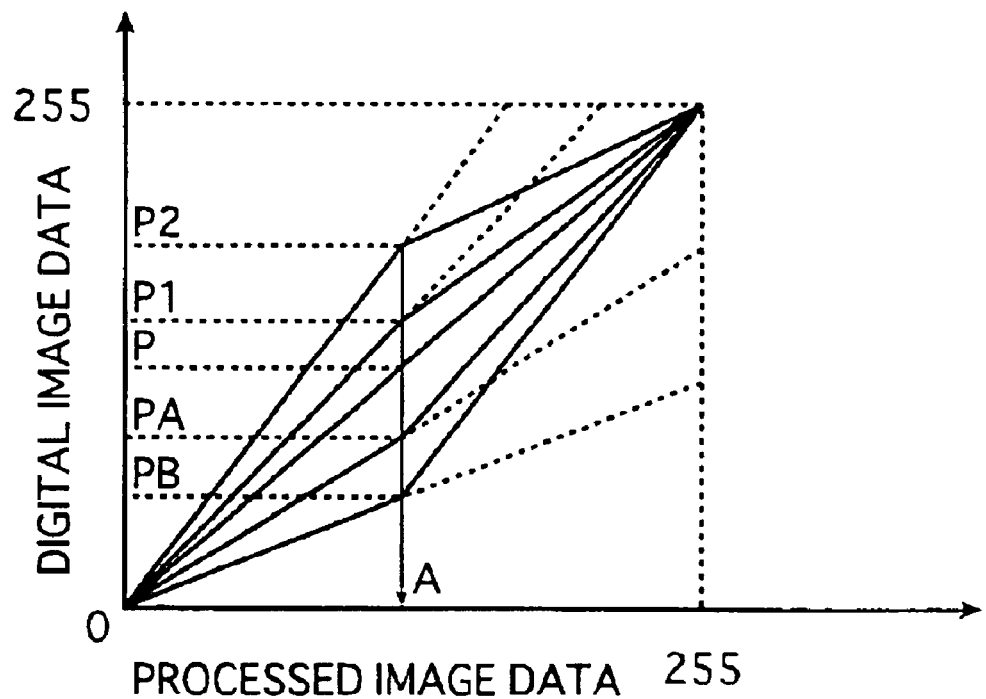
FIG. 8 is a diagram (part 1) showing one example of the second conversion table in another embodiment.

Next, a second embodiment of the present invention will be described. In the second embodiment, the second conversion table (LUT2) is converted by the mean value M obtained in the first embodiment, i.e., the characteristic value and the representative value of the principal image area. FIG. 8 is a diagram showing the second conversion table (LUT2) in the second embodiment. Four conversion conditions shown in FIG. 8 are acquired in such a way that the conversion is performed so that the characteristic value of the digital image data S becomes a value A in the processed image data S', and, with this value A being reference, the first conversion table (LUT1) is modified. When the characteristic value of the digital image data S becomes $P_2$ and P1, the value A is smaller than the characteristic value, and hence the digital image data S is modified so that the density in the processed image data S' increases.

With the density thus modified, as indicated by the broken line in FIG. 8, the processed image data S' is converted into only a smaller value than 255, and the image obtained by reproducing the processed image data S' turns out to be an unnatural output image, wherein the white of the subject can not be reproduced as being white, and at the same time the density increases while the highlight area is kept in its characteristic of soft tone. Accordingly, for preventing such a saturation of the processed image data S', as shown by the solid line in FIG. 8, the conversion conditions are modified so that all or a part of the highlight image area of the processed image data S' is linearly or non-linearly hardened in tone, i.e., so that the digital image data S is compressed. As described above, the tone of the highlight image area is hardened, whereby the highlight image area of the processed image data S', in which the white is unable to be reproduced as being white, is modified and can thus be reproduced as being white. Further, the conversion is implemented so that the characteristic value becomes the desired value A. The desired value A corresponds to a value of the principal part of the processed image data, and may be predetermined. That is, P1 and P2 may be determined from the predetermined value A.

On the other hand, if the characteristic value of the digital image data S becomes PA or PB, the characteristic value is smaller than the value A, and hence the digital image data S is modified so that the density decreases with respect to the processed digital image data S'. With the density thus modified, however, as shown by the broken line in FIG. 8, if the image data is not more than 255, the data in the highlight area of the output image comes to 255 enough to cause the saturation thereof. As a result, the image in the highlight area is washed-out and discontinued in density and therefore unable to be reproduced. Accordingly, as shown by the solid line in FIG. 8, the conversion condition is modified so that all or a part of the highlight image area of the processed image data S' is linearly or non-linearly softened in tone, i.e., so that the digital image data S is extended. With the highlight image area thus softened in terms of its tone, in the image obtained by reproducing the processed image data S', the highlight image area can be reproduced without being washed-out and discontinued in density.

As discussed above, even an over-exposure image, of which a density has hitherto been difficult to modify, can be reproduced as a proper image by hardening the tone of the highlight image area. Note that the more tone hardening is required to be done as the digital image data S is modified to attain a larger value as being the processed image data S'. A limit value may, however, be set in the tone hardening, or the degree of the tone hardening may be made smaller with the conversion into a smaller value as being the processed image data S'.

Figure 9:
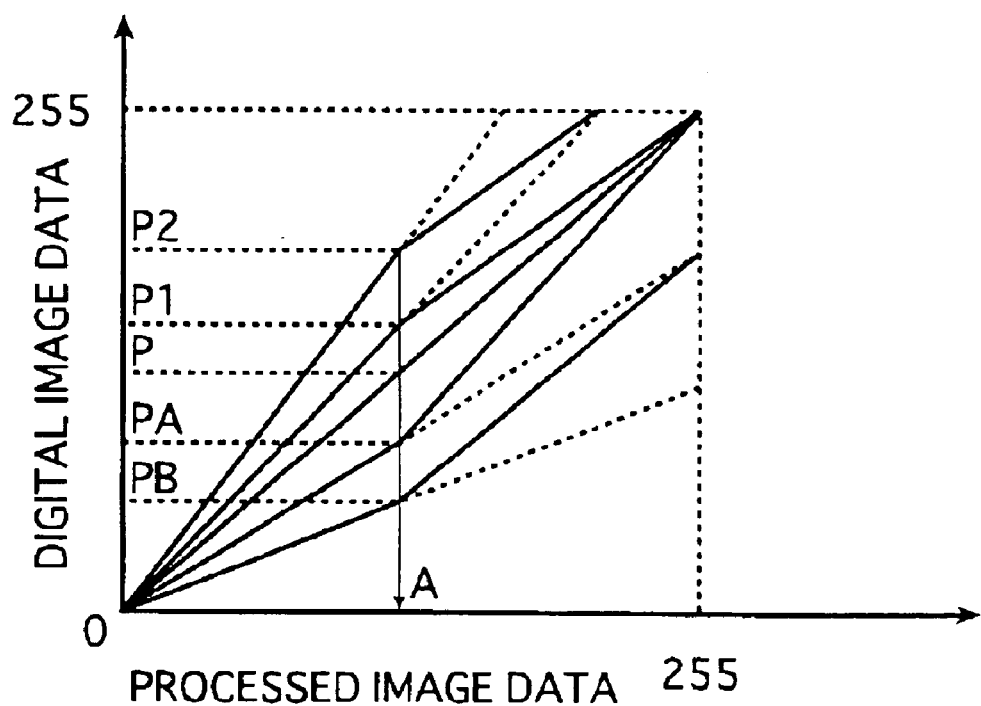
FIG. 9 is a diagram (part 2) showing one example of the second conversion table in another embodiment.

Incidentally, if there is a large difference from the value A as in the case of the characteristic value P2, there must be a limit in the modification of the conversion condition. If over this limit, there might be a possibility in which a pseudo outline appears in the image expressed by the processed image data S'. Further, information for distinguishing the white from the highlight image similar to the white, is deficient. Therefore, the conversion condition is not necessarily modified so that the value of the processed image data S' is converted into 255, and as shown in FIG. 9 a value smaller than 255 be is preferably set as a maximum reference value.

Moreover, as for the characteristic value PB, there is also a large difference from the value A, and consequently there is a limit in the modification of the conversion condition. If over this limit, the tone of the highlight area of the face might be over-softened. It is therefore preferable that the degree of the tone softening be made small as shown in FIG. 9.

Figure 10:
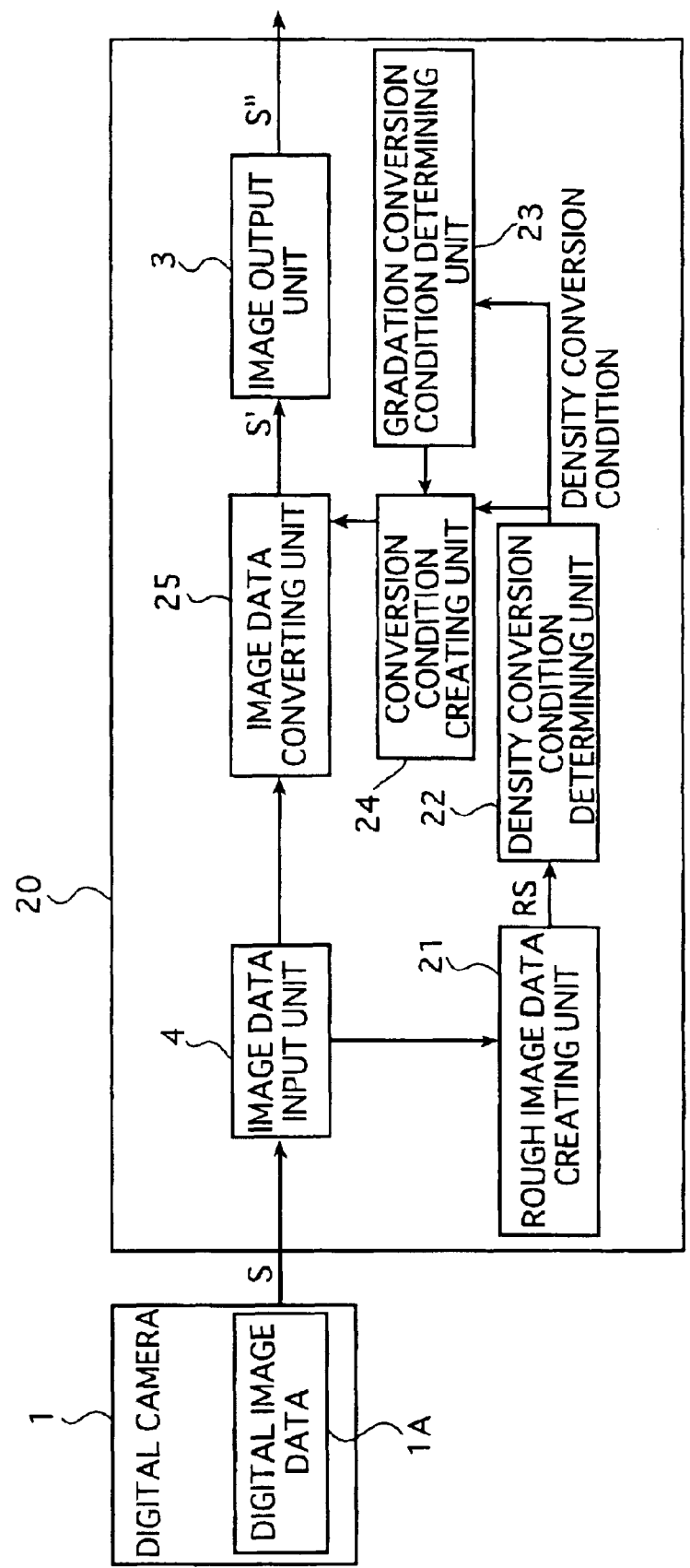
FIG. 10 is a block diagram showing a construction of the image reproducing system encompassing the image processing apparatus in another embodiment of the present invention.

FIG. 10 is a block diagram illustrating the image processing apparatus in a third embodiment of the present invention. Referring to FIG. 10, there are shown the digital camera 1, an image processing apparatus 20, and the input unit (means) 4 for reading the digital image data S from the recording medium 1A.

Further, a rough image data creating unit (means) 21 creates rough image data RS by thinning out the pixels of the digital image data S. A density conversion condition determining unit (means) 22 determines a condition for increasing or decreasing a density of a print image from the image expressed by the digital image data S. A gradation conversion condition determining unit (means) 23 controls gradations (particularly, a gradation of the highlight area) on the basis of the density conversion conditions (e.g., the modification value C used in common to the image data R, G and B, and the conversion conditions shown in FIG. 4 in the first embodiment) determined by the above density conversion condition determining unit 22.

The gradation conversion condition determining unit (means) 23 is stored with a method of determining a gradation conversion condition, and determines the gradation conversion condition on the basis of the density conversion condition. The gradation conversion condition defines a way to change gradation, an example of which is such that the gradation is varied depending on a size of the image data, upper and lower limits of the gradation are set to that gradation, and a uniform gradation is assigned to the area over the upper limit or under the lower limit.

A conversion condition creating unit (means) designated by a reference numeral 24 creates an image data conversion curve and/or a conversion table (LUT2 in the first embodiment) for prescribing a relationship between the image data to be inputted and the modified image data to be outputted. Note that the above-mentioned density conversion condition determining unit 22 may be an automatic determining unit (means) or a unit (means) for manually inputting density control quantity, i.e. an input device such as a keyboard and a mouse.

An image data converting unit (means) 25 receives as an input value the image data from the image data input unit 4, and obtains the modified image data from the conversion table created by the conversion condition creating unit 24. The image output unit 3 is a converting unit using the LUT (look-up table) for a conversion into an image output signal so that the reference value of the digital image data S becomes a predetermined output density.

The operation in the third embodiment will hereinafter be exemplified by giving an example where the above density conversion condition determining unit 22 automatically determines a density control condition.

In creating the image characteristic value, as shown in the preceding embodiments, there is obtained a representative value representing the principal image area, which is, for example, a mean value of the image area corresponding to the skin, especially, the face of the person defined as the principal subject. Furthermore, a background image area is removed, then a remaining image area is consequently set as a principal image area, and a mean value of the image data of this principal image area is used.

For instance, as shown in FIG. 3, the image expressed by the digital image data is divided into a plurality of areas, and there are obtained image characteristic values (Xj), e.g., a mean value, a maximum value and a minimum value of a plurality of areas determined from the respective divided areas or selected areas (e.g., a central area and a peripheral area). Herein, the symbol "j" is for the category of the image characteristic value. Obtained here is a linear combination of those image characteristic values, e.g., a synthetic characteristic value Y (=Σ(kj·Xj)), where kj is the weight coefficient.

Note that the characteristic values are not limited to the above-described mean value, the maximum value and the minimum value, and may be, as explained above, values obtained from the histogram and the cumulative histogram.

The density conversion condition based on the image characteristic values is obtained by giving a statistically proper weight coefficient to one or a plurality of image characteristic values described above. The condition can be statistically determined by the multiple regression analysis, wherein the image data modification quantity for obtaining a desired output value is set, in other words, a modification quantity for adjusting to a proper density the density of a print obtained from the digital camera without modifying as an objective function (or variable), and the image characteristic value is set as an explanatory function (or variable).

The weight coefficient described above is determined simultaneously in combination with a weight coefficient for obtaining the density conversion condition. The density conversion condition is the image data modification value based on a value obtained from a single or a plurality of image characteristic values to attain the desired output image data (from which a desired print density is obtained). The value obtained from the single or the plurality of image characteristic values corresponds to a data value of the principal image area, and the print image from the modified image data based on this data value becomes constant in terms of its principal image area density.

The gradation conversion condition determining unit 23 determines a condition for converting the gradation by a method determined based on the density conversion condition determined by the density conversion condition determining unit 22, or by a predetermined method. There are set, e.g., data values of a starting point and the highest point (the maximum value, and the maximum fiducial point on the histogram), and a gradation change from the starting point to the highest point.

These may be changed depending upon a subject scene and an exposure level.

Further, a relative gradation profile extending from the starting point to the highest point is judged by setting a possible maximum gradation (e.g., 4.0) and a possible minimum gradation (e.g., 0.3), and the gradation is set constant when over or under the limit value.

Figure 11:
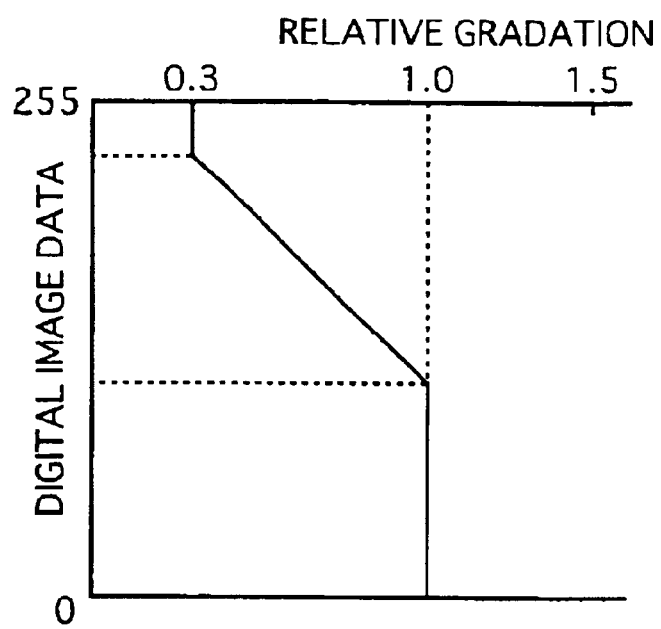
FIG. 11 is a graph showing one example of a relative gradation profile used in the image processing apparatus in the embodiment shown in FIG. 10.

FIG. 11 shows one example of the specific relative gradation profile. FIG. 11 is a graph, wherein the axis of abscissas indicates the relative gradation, and the axis of ordinates indicates the image data after the DSC (digital still camera) density modification, and shows that a relative gradation 1.0 is a state where the gradation is not modified, and that the relative gradation is modified depending on a size of this piece of image data.

In the example of the relative gradation profile shown in FIG. 11, the gradation value to a middle density region is 1.0, and decreases as the size of the data increases. A lower limit of the gradation value is, however, clipped at 0.3, and the gradation of the image data given from the digital camera is converted within this range. Note that the relative gradation profile is not necessarily linear but may be, as a matter of course, non-linear.

Figure 12:
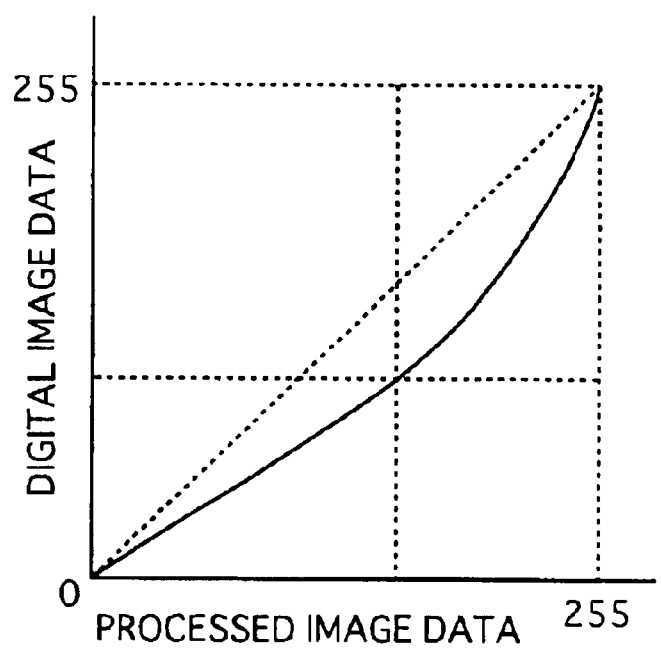
FIG. 12 is a graph showing a data conversion curve corresponding to the relative gradation profile shown in FIG.

FIG. 12 shows a data conversion curve corresponding to the relative gradation profile shown in FIG. 11.

The gradation profile and the gradation conversion condition may be obtained by setting a relationship with the density conversion condition so as to become white or a value approximate to the white at the highest point, and executing an interpolation based on the density conversion condition. For instance, the gradation profile is stored in the form of the curve shown in FIG. 11, and the gradation conversion condition is expressed by parameters and a conditional formula involving the use of a mathematical formula and a determination formula.

The above lower limit value 0.3 serves to prevent the tone of the image from being over-softened. Further, if the density conversion condition is large (e.g., the modification value C is large), no curve for making the image white is obtained, and it follows that the value is confined to a value more approximate to the white.

The data conversion curve shown in FIG. 12 and the gradation conversion condition may be obtained by an interpolation and an extrapolation or weighting in accordance with the predetermined single or plurality of basic curves. Moreover, the curve may also be acquired by a calculation using a function approximate to the curve. Still further, the interpolation, the extrapolation or weighting, the parameter approximate to the function, and the gradient may be changed depending on the scene and the image characteristic value.

The conversion condition may involve the use of one conversion table into which to combine the conversion table for obtaining the density conversion condition and the conversion table for obtaining the gradation conversion condition. Further, it is appropriate that conversion table for obtaining the density conversion condition is determined, and then is performed a modification for converting the gradation. Alternatively, separate conversion tables may be acquired and respectively used.

Figure 13:
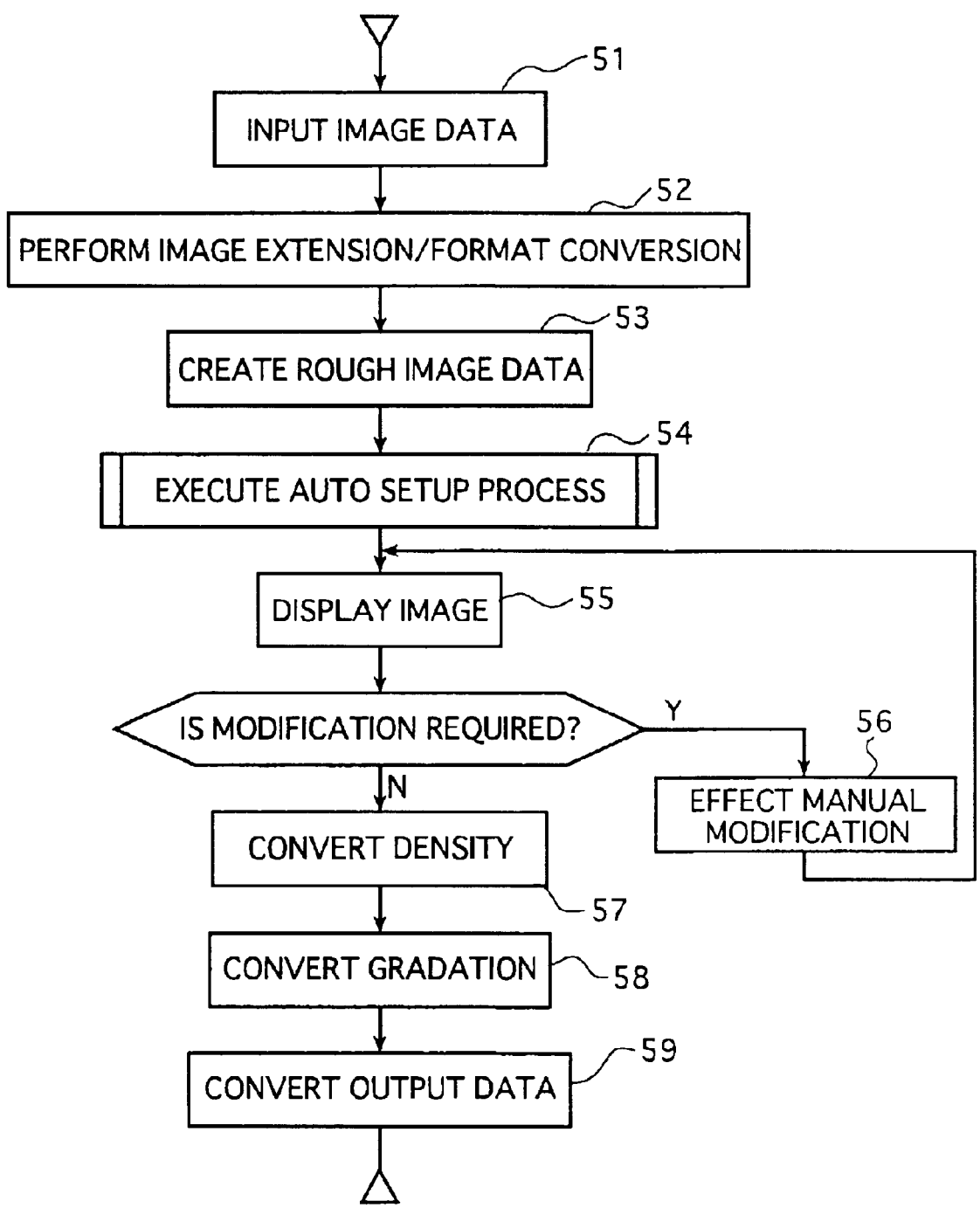
FIG. 13 is a flowchart showing an operation of the image processing apparatus in the embodiment shown in FIG. 10.

FIG. 13 is a flowchart showing an operation of the image processing apparatus in the third embodiment. The operation of the image processing apparatus in the third embodiment will hereinafter be explained.

To begin with, the image data input unit 4 inputs the digital image data S from the recording medium of the digital camera (step 51). Next, an image extending/format-converting unit (not shown) extends the digital image data S and converts a format thereof (step 52), and the processed data is recorded on an unillustrated image memory.

The rough image data creating unit 21 reads the digital image data S described above and thins out the pixels thereof, thus creating the rough image data RS (step 53). The rough image data RS is inputted to the density conversion condition determining unit 22. The rough image data RS is used for an auto setup process (step 54). Upon an end of the auto setup process, the image is displayed on a display unit (step 55). The operator observes this displayed image, and may input a manual modification condition as the necessity arises (step 56). Note that a method of reducing the number of pixels by averaging Ld the pixels is usable as a substitute for the pixel thin-out method. Further, a method of combining the pixel averaging method with the pixel thin-out method, may also be effective.

The density conversion condition determining unit 22 converts, into a density conversion condition, a density modification quantity determined in the auto setup process or a density modification quantity indicated from the operator on the basis of a predetermined converting method (step 57), and inputs this condition to the gradation conversion condition determining unit 23. The gradation conversion condition determining unit 23 determines a gradation conversion condition by the predetermined method on the basis of the inputted density conversion condition (step 58).

The conversion condition creating unit 24 creates an image data conversion curve and/or conversion table (LUT2 in the first embodiment) for setting a relationship between the image data to be inputted and the modified image data to be outputted, from the conversion conditions inputted by the gradation conversion condition determining unit 23 as well as by the density conversion condition determining unit 22.

The image data converting unit 25 receives as an input value the image data from the image data input unit 4, and obtains the modified image data S' from the image data conversion curve and/or conversion table created by the conversion condition creating unit 24. In the image output unit 3, a process adapted to the output unit is effected on the modified image data S', thereby obtaining the output image data S" (step 59).

In the third embodiment, the modified image data is obtained from the density conversion condition and the gradation conversion condition based on this density conversion condition, and it is therefore possible to reproduce the image with a uniform image density and a preferable gradation expression by correcting an overexposure and an underexposure of the digital camera.

Figure 14:
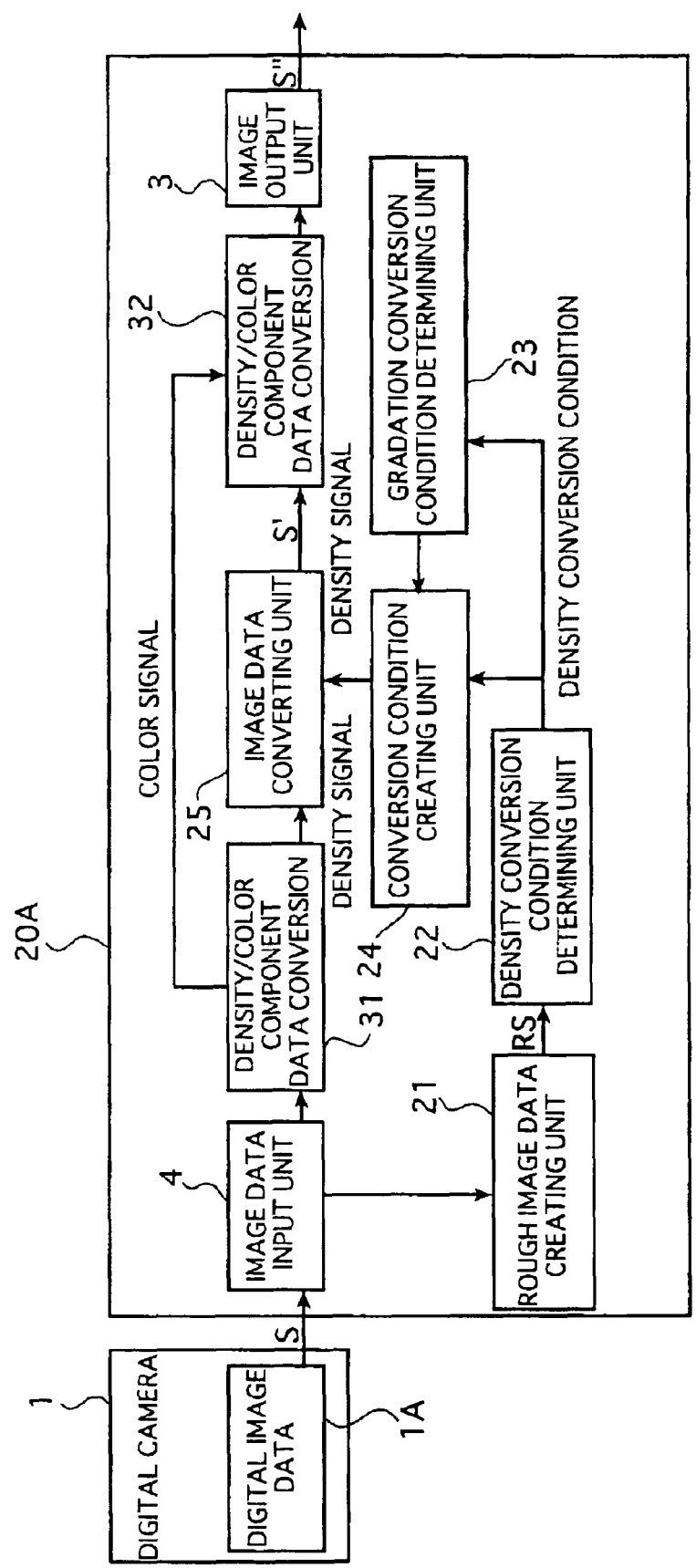
FIG. 14 is a block diagram showing a construction of the image reproducing system embracing the image processing apparatus in still another embodiment of the present invention.

FIG. 14 is a block diagram showing an image processing apparatus 20A in a fourth embodiment of the present invention. A difference from the embodiment illustrated in FIG. 10 is such a point that the input image data is separated into the density component and the color component to be processed. To be more specific, the image processing apparatus 20A according to the fourth embodiment has a density/color component data converting unit (means) 31 which separates the input image data into the density component and the color component. The processes thereafter are substantially the same as those in the embodiment illustrated in FIG. 10, and the density/color component data synthesizing unit (means) 32 synthesizes the modified image data S' with the previously separated color component data.

That is, according to the fourth embodiment, the image data is converted into the density component data and the color component data, and the density correction and the gradation correction based on this density correction, are executed upon the density component data. Thereafter, these two items of data are synthesized. With this contrivance, no color change of the print can be seen before and after the modification even by having modified the density and the gradation.

The method of converting the image data of the digital camera into the density component data and the color component data, may involve the use of a known method. Instead of the density component data, there may be used luminance component data (Y=0.30R+0.59G+0.11B) and data (L* and Y) converted into lightness in terms of a color science.

It should be noted that the density (luminance) component data and the lightness component data can be equally treated. Further, saturations and hues in terms of the color science such as R-G, B-G and r-k, g-k, b-k are usable as the color component data.

In the fourth embodiment, the process of obtaining the modified image data from the density conversion condition and the gradation conversion condition based on this density conversion condition, is executed in such a form as to separate the density (luminance) and the color from each other, and the overexposure and the underexposure of the digital camera are corrected, whereby the image can be reproduced with the uniform image density and preferable gradation expression.

Incidentally, in each of the embodiments discussed above, the image processing apparatus 2 or 20 or 20A is provided separately from the digital camera 1, however, the digital camera 1 may be provided with the image processing apparatus 2 or 20 or 20A.

According to the image processing method and image processing apparatus of the present invention, the density of the digital image data is automatically or manually modified, thereby optimizing the density and gradation of the reproduced image. It is therefore possible to obtain the high-quality image and convert the digital image data so as to be reproducible with the uniform image density by correcting the underexposure of the digital camera.

More specifically, even when decreasing the print density of the print obtained from the digital camera image, a large proportion of the highlight image photographed can be reproduced as a print image by modifying the gradation of the highlight area on the basis of the density modification quantity. Namely, if the image data is corrected so as to decrease the print density in the prior art, the reproduction of the highlight area such as a background has been deteriorated. This problem is, however, now resolved.

Moreover, even when increasing the print density of the print obtained from image of the digital camera, the highlight image photographed can be reproduced as a print image exhibiting a preferable color and density by modifying the gradation of the highlight area on the basis of the density modification quantity. Note that even when the density of the image of the digital camera is, after being automatically modified, manually modified, the high-quality print can be acquired.

Further, the gradation of the highlight area of each of the overexposure and underexposure images is modified to a proper gradation, whereby the latitude of the exposure of the digital camera can be increased. This makes it possible to reduce defective images.

Moreover, the characteristic value is obtained as a representative value representing the principal image area in the image expressed by the digital image data, and the tone hardening or softening is performed based on the representative value when obtaining the conversion table. The highlight area of the processed image data is thereby hardened and softened in its tone without change in the density of the image expressed by the representative value. It is therefore possible to modify the density of the principal image area into a desired value irrespective of a degree of tone hardening and softening.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An image processing method of creating output image data for obtaining a reproduced image by executing image processing on digital image data obtained by a digital camera, comprising:

a step of determining at first a density conversion condition for an image expressed by the digital image data, the density conversion condition being a first conversion function for density correction between the digital image data and the output image data to increase or decrease a density of a whole image;

a step of determining next a gradation conversion condition for the image expressed by the digital image data on the basis of the density conversion condition, the gradation conversion condition being a second conversion function for the density correction and gradation correction between the digital image data and the output image data to control gradations in a predetermined range of the density of the image; and a step of modifying the digital image data on the basis of the density conversion condition and the gradation conversion condition, thereby creating the output image data for obtaining the reproduced image, wherein a predetermined value is inputted and the gradation conversion condition is so determined as to harden or soften a tone of the image expressed by the digital image data based on the predetermined value.

2. An image processing method of creating output image data for obtaining a reproduced image by executing image processing on digital image data obtained by a digital camera, comprising:

a step of separating the digital image data into density component data and color component data;

a step of determining a density conversion condition for converting a density of the density component data, the density conversion condition being a first conversion function for density correction between the density component data and a modified density component data to increase or decrease a density of a whole image;

a step of determining a gradation conversion condition for converting a gradation of the digital image data on the basis of the density conversion condition, the gradation conversion condition being a second conversion function for the density correction and gradation correction between the density component data and the modified density component data to control gradations in a predetermined range of the density of the image;

a step of modifying the density component data in accordance with the density conversion condition and the gradation conversion condition; and a step of synthesizing the modified density component data with the color component data, thereby creating the output image data for obtaining the reproduced image, wherein a predetermined value is inputted and the gradation conversion condition is so determined as to harden or soften a tone of the image expressed by the digital image data based on the predetermined value.

3. The image processing method according to claim 1 or 2, wherein the density conversion condition is determined based on a characteristic value of the image expressed by the digital image data.

4. The image processing method according to claim 3, wherein the characteristic value of the image is a mean value of densities of the digital image data.

5. The image processing method according to claim 3, wherein the characteristic value is a weighted mean value based on a weight coefficient determined by a color in each pixel of the digital image data.

6. The image processing method according to claim 1 or 2, further comprising the steps of displaying the image expressed by the digital image data on a display means and inputting an instruction from outside based on the displayed image, and wherein the density conversion condition is determined by the instruction inputted from outside based on the displayed image.

7. The image processing method according to claim 1 or 2, wherein the gradation conversion condition is determined so that a brightest area of the reproduced image becomes white or comes to have a density approximate to the white.

8. The image processing method according to claim 1 or 2, wherein the gradation conversion condition has a lower limit value thereof.

9. An image processing apparatus for creating output image data for obtaining a reproduced image by executing image processing on digital image data obtained by a digital camera, comprising:

density conversion condition determining means for determining a density conversion condition for an image expressed by the digital image data, the density conversion condition being a first conversion function for density correction between the digital image data and the output image data to increase or decrease a density of a whole image;

gradation conversion condition determining means for determining a gradation conversion condition for the image expressed by the digital image data on the basis of the density conversion condition, the gradation conversion condition being a second conversion function for the density correction and gradation correction between the digital image data and the output image data to control gradations in a predetermined range of the density of the image; and image data converting means for creating the output image data for obtaining the reproduced image by modifying the digital image data on the basis of the density conversion condition and the gradation conversion condition, wherein a predetermined value is inputted and the gradation conversion condition is so determined as to harden or soften a tone of the image expressed by the digital image data based on the predetermined value.

10. An image processing apparatus for creating output image data for obtaining a reproduced image by executing image processing on digital image data obtained by a digital camera, comprising:

data separating means for separating the digital image data into density component data and color component data;

density conversion condition determining means for determining a density conversion condition for converting a density of the density component data, the density conversion condition being a first conversion function for density correction between the density component data and a modified density component data to increase or decrease a density of a whole image;

gradation conversion condition determining means for determining a gradation conversion condition for converting a gradation of the digital image data on the basis of the density conversion condition, the gradation conversion condition being a second conversion function for the density correction and gradation correction between the density component data and the modified density component data to control gradations in a predetermined range of the density of the image;

data converting means for modifying the density component data in accordance with the density conversion condition and the gradation conversion condition; and data synthesizing means for synthesizing the modified density component data with the color component data, thereby creating the output image data for obtaining the reproduced image, wherein a predetermined value is inputted and the gradation conversion condition is so determined as to harden or soften a tone of the image expressed by the digital image data based on the predetermined value.

11. The image processing apparatus according to claim 9 or 10, wherein said density conversion condition determining means determines the density conversion condition on the basis of a characteristic value of the image expressed by the digital image data.

12. The image processing apparatus according to claim 11, wherein the characteristic value of the image is a mean value of densities of the digital image data.

13. The image processing apparatus according to claim 11, wherein the characteristic value is a weighted mean value based on a weight coefficient determined by a color in each pixel of the digital image data.

14. The image processing apparatus according to claim 9 or 10, further comprising a display means for displaying the image expressed by the digital image data, and input means for inputting an instruction from outside based on the displayed image, and wherein said density conversion condition determining means determines the density conversion condition by the instruction inputted from outside on the basis of the displayed image.

15. The image processing apparatus according to claim 9 or 10, wherein said gradation conversion condition determining means determines the gradation conversion condition so that a brightest area of the reproduced image becomes white or comes to have a density approximate to the white.

16. The image processing apparatus according to claim 9 or 10, wherein the gradation conversion condition determining means provides the gradation conversion condition with a lower limit value.

17. An image processing method of creating a reproduced image by executing image processing on digital image data obtained by a digital camera, comprising the steps of:

calculating a mean value of the digital image data;

calculating an output AIM value of processed pieces of image data;

determining a modification value for modifying the digital image data using the calculated mean value and the calculated output AIM value;

creating a first conversion table for converting the digital image data using the modification value;

creating a second conversion table for modifying the first conversion table; and generating processed image data by converting the digital image data using the second conversion table, thereby creating the reproduced image.

18. The image processing method of claim 17, further comprising the step of classifying a pixel of the image data into one of a plurality of regions in a system of coordinates wherein a first axis of coordinates corresponds to a first color difference between a first color component and a second color component of the pixel, and a second axis of coordinates corresponds to a second color difference between the second color component and a third color component of the pixel, wherein the step of calculating the mean value includes multiplying the pixel with a weight value that depends on the region into which the pixel is classified.

19. The image processing method of claim 18, wherein the plurality of regions includes a first region in a vicinity of an origin of the system of coordinates, a second region extending outside of the first region, and a third outermost region.

20. The image processing method of claim 19, wherein the weight value is 1.0 in the first region, 0.5 in the second region and 0 in the third region.

21. The image processing method of claim 19, wherein the weight value is proportional to a distance from the origin of the system of coordinates.

22. The image processing method of claim 18, wherein the weight value is 1.0 in a first region, 0.5 in a second region and 0 in a third region.

23. The image processing method of claim 18, wherein the weight value depends on a lightness of the digital image data, the weight value being smaller when the lightness of the image data is larger.

24. The image processing method of claim 17, further comprising the step of classifying pixels of the image data into a background image area and a principal image area, wherein the mean value is calculated using the pixels within the principal image area.

25. The image processing method of claim 24, wherein the background image area is a neutral color image area over an highlight image area of a predetermined size wherein a difference between pixel values is small.

26. The image processing method of claim 17, further comprising the step of, prior to calculating the mean value, generating a rough image data by thinning out pixels of the digital image data, wherein the mean value is calculated using the pixels within the rough image data.

27. The image processing method of claim 17, wherein the modification value is a ratio of the mean value and the output AIM value.

28. The image processing method of claim 17, wherein the modification value is a difference between the mean value and an offset of the output AIM value, wherein the offset of the output AIM value is calculated by subtracting a constant value from the output AIM value.

29. The image processing method of claim 17, wherein the modification value is a ratio of the mean value and the output AIM value, wherein the ratio is weighted by a constant value.

30. The image processing method of claim 17, wherein the first conversion table converts the digital image data into a modified image data of lower value than that of the digital image data, thereby decreasing a density of the digital image data when the digital image data corresponds to an overexposure, and the first conversion table converts the digital image data into a modified image data of higher value than that of the digital image data, thereby decreasing the density of the digital image data when the digital image data is a contrejour scene.

31. The image processing method according to claim 1 or 2, wherein the density conversion condition is a density conversion table for the density correction, and the gradation conversion condition is a gradation conversion table for the density correction and the gradation correction.

32. The image processing apparatus according to claim 9 or 10, wherein the density conversion condition is a density conversion table for the density correction, and the gradation conversion condition is a gradation conversion table for the density correction and the gradation correction.

33. The image processing method according to claim 1, wherein the gradation conversion condition is a conversion function such that, when a density of modified image expressed by modified image data obtained by modifying the digital image data based on the density conversion condition becomes larger than a predetermined density, a tone of image data of highlight side of the modified image data is hardened, and when the density of the modified image becomes smaller than a predetermined density, the tone of the image data of the highlight side of the modified image data is softened.

34. The image processing method according to claim 2, wherein the gradation conversion condition is a conversion function such that, when a density of modified image expressed by modified image density data obtained by modifying the density component data based on the density conversion condition becomes larger than a predetermined density, a tone of image data of highlight side of the modified image density data is hardened, and when the density of the modified image becomes smaller than a predetermined density, the tone of the image data of the highlight side of the modified image density data is softened.

35. The image processing apparatus according to claim 9, wherein the gradation conversion condition is a conversion function such that, when a density of modified image expressed by modified image data obtained by modifying the digital image data based on the density conversion condition becomes larger than a predetermined density, a tone of image data of highlight side of the modified image data is hardened, and when the density of the modified image becomes smaller than a predetermined density, the tone of the image data of the highlight side of the modified image data is softened.

36. The image processing apparatus according to claim 10, wherein the gradation conversion condition is a conversion function such that, when a density of modified image expressed by modified image density data obtained by modifying the density component data based on the density conversion condition becomes larger than a predetermined density, a tone of image data of highlight side of the modified image density data is hardened, and when the density of the modified image becomes smaller than a predetermined density, the tone of the image data of the highlight side of the modified image density data is softened.

* * * * *